(12) United States Patent
Natapov

(10) Patent No.: US 6,339,959 B1
(45) Date of Patent: Jan. 22, 2002

(54) MAGNETIC FLOAT TYPE FLOWMETER

(75) Inventor: Vladimir Natapov, Nesher (IL)

(73) Assignee: N.M.F. Ltd., Jordan Valley (IL)

( * ) Notice: Subject to any disclaimer, the term of this patent is extended or adjusted under 35 U.S.C. 154(b) by 0 days.

(21) Appl. No.: 09/567,986

(22) Filed: May 10, 2000

(51) Int. Cl.$^7$ ................................................. G01F 3/08
(52) U.S. Cl. ..................... 73/239; 73/861.08; 73/861.57
(58) Field of Search ............................... 73/861, 861.08, 73/239, 305, 307, 317, 861.57, 861.55, 252

(56) References Cited

U.S. PATENT DOCUMENTS

| | | | |
|---|---|---|---|
| 4,041,756 A | 8/1977 | Head et al. | 73/194 |
| 4,368,646 A | 1/1983 | Rogg | 73/861.55 |
| 5,214,964 A | * 6/1993 | Hartfiel | 73/861 |
| 5,520,058 A | * 5/1996 | Campbel et al. | 73/861.08 |
| 5,578,763 A | 11/1996 | Spencer et al. | 73/861.08 |

FOREIGN PATENT DOCUMENTS

DE    3341661    8/1984

OTHER PUBLICATIONS

DIN 17–405 Germany.

* cited by examiner

Primary Examiner—Benjamin R. Fuller
Assistant Examiner—Corey D. Mack
(74) Attorney, Agent, or Firm—Blank Rome Comisky & McCauley LLP

(57) ABSTRACT

The present invention relates to magnetic flow meters comprising a floating member, made of magnetically responsive material and residing within a tubular conduit, through which the fluid flows. The flow meters are provided with a means for producing magnetic field in the conduit. A response signal is generated upon displacement of the float member within the magnetic field by the flowing fluid. Flow rate value is obtained by processing the response signal and comparing it with a calibration curve.

9 Claims, 1 Drawing Sheet

MAGNETIC FLOAT TYPE FLOWMETER

FIELD OF THE INVENTION

The present invention refers to flow meters, suitable for measuring, monitoring and controlling of volume or mass flow rate of various gaseous or liquid fluids or streams of particulate materials.

More particularly the present flow meter refers to so-called magnetic flow meters, employing a floating member, made of magnetically responsive material and residing within a tubular conduit, through which the fluid flows. Such flow meters are provided with a means for producing magnetic field in the conduit and they generate a response signal upon displacement of the float member within the magnetic field by the flowing fluid. Flow rate value is obtained by processing the response signal and comparing it with the a calibration curve.

BACKGROUND OF THE INVENTION

There are known various flow meters, which have been devised for measuring of flow rate and which are based on various physical principles.

For example so-called Coriolis flow meter employ a sensor tube, through which the fluid flows and twists the tube. This twisting characteristic is called the Coriolis effect. According to Newton's Second Law of Motion, the amount of sensor tube twist is directly proportional to the mass flow rate of the fluid flowing through the tube.

The Coriolis flow meters are reliable instruments, which capable to measure wide range of flow rate of fluids from several kg to several hundreds of tons per hours with accuracy ±(0.15–0.25)% of rate±zero stability. Unfortunately, their construction is rather complicated and they are expensive items.

There are known also magnetic flow meters, employing a responsive signal generated by a ferromagnetic floating member, residing in a conduit in which a magnetic field is created and is displaced by the fluid flowing through the conduit.

In DE3341661 is disclosed float-type flow meter consisting of a cylindrical non-ferromagnetic measuring tube having a baffle arranged in the interior of the tube. A conical ferromagnetic float is located in the tube and there is provided two coils arranged axially in the tube. The coils are energized by a source of alternating voltage. The coils are electrically connected to provide a differential transformer, which is capable to generate a responsive signal upon variation of inductivity in the coils when the float displaces. This signal is processed and after comparing with a pre-established calibration curve, the flow rate is derived.

In this flow meter the flow rate value depends on the relationship between the cross section of the float and the inner diameter of the measuring tube. Due to this provision the flow meter is capable to measure only small and extremely small flow rates.

Furthermore, operating of this instrument is not convenient, since it requires pre-establishing of dedicated calibration curve for each fluid, to be measured and therefore it is not possible to work with a single, universal calibration curve.

There are known also magnetic flow meters, in which magnetic force is employed to resist the drag force of the flowing fluid imposed on the float to retain the float in neutral position.

In U.S. Pat. No. 4,041,756 is described a flow meter including a vertically positioned flow tube having ferromagnetic ball residing therein. The ball is subjected to the force of gravity as well of the drag force imposed by the flow of fluid. Associated with the flow tube is a position sensor, employing a light source projecting a beam across the translucent tube and a photo sensor, yielding a control signal once the ball obscures the beam. A magnetic means is provided for producing electromagnetic field in the flow tube. The magnetic means is formed as electromagnet consisting of electrically conductive wire coil wound around a core. The electromagnet is energized by a current controller and governed by the control signal. The electromagnet produces a magnetic force, seeking to displace the ball and retain thereof away from the light beam. Thus the ball is caused to reside the position depending on the vector resultant of the co-acting drag force, produced by the fluid, gravitational and magnetic force. The time average current generated by the controller is a function of the flow rate.

This flow meter has number of intrinsic disadvantages. Since it employs optical sensor it requires that the measuring tube be made of transparent material and therefore the operation is limited strictly to measurement of flow rate of transparent fluids. The other disadvantage of this flow meter is associated with the configuration of its magnetic means, consisting of a coil, wound around the core. This construction necessitates that the mass of the ball is comparable with the mass of the core and therefore significant currents might be required to ensure retaining the ball. This requirement renders the flow meter less sensitive to variation of the magnetic force and therefore to variation of the flow rate.

Besides, since the above construction of the magnetic means does not prevent the ball from reciprocating motion and therefore the measurement is less accurate.

Even more sophisticated flow meter based on similar principle is disclosed in U.S. Pat. No. 5,578,763. This flow meter comprises a conduit, through which the fluid flows, a stop in the conduit and a float body, movably received in the conduit. The float body is normally kept by the flow in engagement with the stop. At least a portion of the float is made of magnetically responsive material. An electromagnet, configured as a wire wound around the dedicated core is located outside the conduit. The poles of the electromagnet impose a magnetic force on the float body once a ramp current generator energizes the electromagnet. An auxiliary multi-turn sensor coil or a magnetic field sensor is wound around the core and is capable to detect changes in the magnetic flux field of the electromagnet, associated with movement of the float body away from the stop and towards the electromagnet. The changes of the magnetic flux are converted into sensing signal, corresponding to the current that caused attraction of the body away from the stop against the force of the fluid flow.

This flow meter does not require any more the use of a transparent conduit and it can be used to measure flow rate of non-transparent fluids.

Nevertheless, it has the same intrinsic disadvantages as the above-described flow meter, since it also employs magnetic means, which is configured as a coil wound around a dedicated core.

In conclusion it should be emphasized that despite the fact that different magnetic flow meters have been devised there is still exists a need in a new and improved flow meter, which will be suitable for accurate and reliable measurement of wide range of volume or mass flow rate.

OBJECTS OF THE INVENTION

The object of the present invention is to provide a new and improved magnetic mass and volume flow meter, which sufficiently reduces or overcomes the above-mentioned drawbacks of the known in the art magnetic flow meters, while preserving their advantages.

In particular, the main object of the present invention is to provide a new and improved mass and volume magnetic flow meter which has simple construction, is inexpensive and which is capable to measure wide range of flow rate.

The other object of the invention is to provide a new and improved magnetic flow meter, which sensitivity and accuracy is comparable with that of the known in the art flow meters and which is capable to operate with fluids, consisting of more than one phase.

The above and other objects and advantages of the present invention can be achieved in accordance with the following combination of its essential features, referring to different embodiments thereof.

According to one of the preferred embodiments, the flow meter of the invention comprises

- a tubular conduit for passing a fluid therethrough,
- a float member, disposed within the conduit with possibility for displacement away from a neutral position by a drag imposed thereon by the fluid, at least a portion of said float member is made of magnetically responsive material,
- a differential transformer means, consisting of two separate coils connected to a variable resistor, said differential transformer means is capable to output a responsive electrical signal upon displacement of the float member from the neutral position,
- a magnetic means, which is associated with the conduit and is capable to exert on the float member a magnetic force sufficient to retain the float member in the neutral position,
- a source of alternating voltage connected to said differential transformer means,
- a signal processing means, capable to process the responsive signal produced by the differential transformer means and to output thereof as a control current signal for controlling the magnetic means,
- a source of reference voltage,
- a calculating means for deriving the flow rate from the control current signal, the input of the calculating means is connected to the output of the signal processing means and to the output of the source of reference voltage,
- a display means for visual representation of the derived flow rate value, wherein said magnetic means is configured as a solenoid, which closely surrounds the conduit, the inwardly facing surface of the solenoid matches the outwardly facing surface of the conduit, said solenoid resides between the coils of the differential transformer means and is connected to the output of the signal processing means. According to the further embodiment, the signal processing means consists of connected in series a subtracting means, a first amplifier, a rectifier, a R-C circuit, a second amplifier and a means for converting the responsive signal into control current signal. As per still further preferred embodiment the coils of the differential transformer means are separated from the solenoid by insulation inserts.

As per yet another preferred embodiment the conduit is configured as a cylinder, made of non-ferromagnetic material and within the conduit are provided two opposite stopper means, limiting the displacement of the float member from the neutral position. In yet another preferred embodiment the float member is configured as elongated body and on the outwardly facing thereof are made ring-like protrusions to center the float member substantially concentrically with the longitudinal axis of the conduit. In still further preferred embodiment within the float member is removable received a disc-like insert provided with a calibrated orifice, said insert is received within the float member substantially concentrically with the longitudinal axis of the conduit.

The present invention in its various embodiments has only been summarized briefly. For better understanding of the present invention as well of its advantages, reference will now be made to the following description of its embodiments with reference to the accompanying drawings.

DETAILED DESCRIPTION OF SPECIFIC EMBODIMENTS

Figure 1:
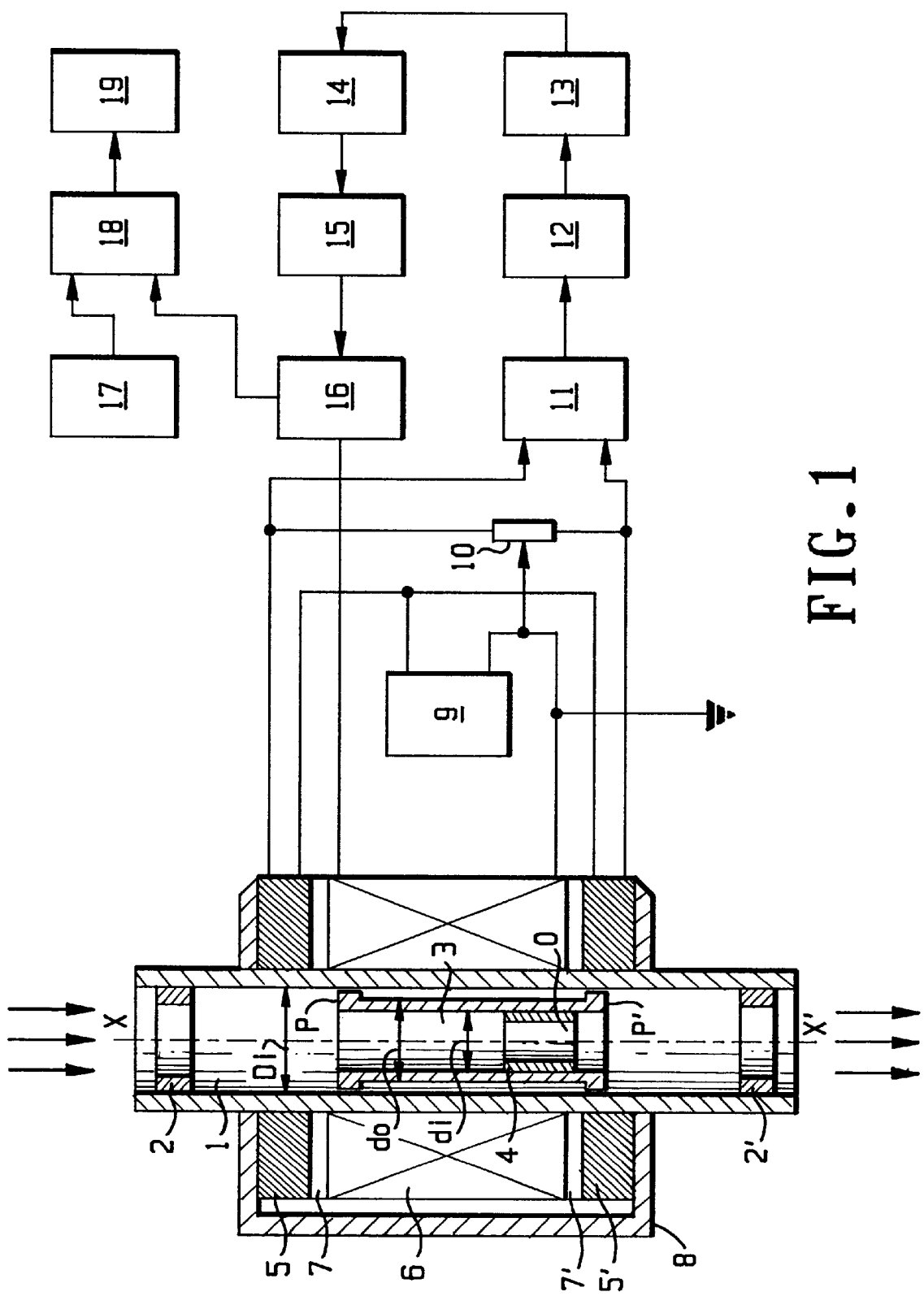
FIG. 1 shows schematically general view of the flow meter of the invention

With reference to FIG. 1 the mechanical portion of the flow meter of the invention comprises an elongated tubular conduit 1, through which continuously flows the fluid as shown by arrows. The conduit is made of a non-ferromagnetic material and is configured as vertically directed cylinder with known inside diameter $D_i$. In the upper and lower extremities of the conduit are arranged respective upper and lower ring-like stoppers 2,2', which allow the fluid to enter and to exit the interior of the conduit. Residing within the conduit is provided a float member 3, which can be displaced along the conduit's interior between the upper and lower stopper. The float member is formed as elongated cylinder, having its respective inside and outside diameter $d_i$, $d_o$. An exchangeable insert 4 might be deployed within the float member so as to vary the inside diameter, through which the fluid flows. The insert tightly seats within the float member and has calibrated orifice of known inner diameter $O_i$, which is less than the inner diameter of the float member.

To enable measurement of wide range of flow rates one can use inserts having different diameter of the orifice and exchange them depending on the required diameter. The outside diameter of the float member is less than the inner diameter of the conduit and by virtue of this provision the float member can be displaced along the conduit by a drag force imposed thereon by the flowing fluid. The outwardly facing cylindrical surface of the float member is formed with two ring-like protrusions P, P', which center the float member within the conduit substantially concentrically with its longitudinal axis X–X'. The protrusions also reduce the friction between the float member and the conduit, when the float member displaces.

The float member is made of magnetically responsive material, having magnetic properties, substantially as defined in DIN 17405. Some non-exhaustive examples of suitable material include unalloyed steel RFe12, silicon steel RSi12, nickel steel, RNi2, etc.

The mechanical part of the flow meter includes also two separated coils 5,5', electrically connected in such a manner, that they constituting a differential transformer. Tightly seating around the conduit between the coils 5,5' is provided a solenoid 6, which can produce magnetic field within at least a portion of the conduit. Washer-like inserts 7 separate the coils and the solenoid. The separating inserts can be made either of ferromagnetic material, if the flow meter is intended for measuring of large flow rates or from any other material, if the flow meter is intended for measuring of small flow rates. The above mechanical portion of the flow meter resides within a housing 8. Now the electrical part of the flow meter will be described.

A source of alternating voltage 9 is connected to the coils of the differential transformer to energize them. Connected to respective input of each coil a variable resistor 10 is provided. By virtue of this resistor the signal outputted by the differential transformer can be adjusted to minimum, when the float member is absent in the conduit. Connected in series with the coils 5,5' are provided a subtracting block 11, a first amplifier 12 a rectifier 13, a R-C circuit 14, a second amplifier 15 and an inverter means 16, capable to convert the responsive electrical signal into a control current signal and supply this signal to solenoid 6. For the sake of brevity the above connected in series components will be referred to as signal processing means. The inverter means also measures the current control signal and outputs its value via dedicated output to the other electronic components of the flow meter as it will be immediately described below.

Connected in series are provided a source of reference voltage 17, a calculating block 18 and a display means 19. The dedicated output of inverter means 16 is connected to the input of the calculating block and thus the value of the current control signal is supplied thereto. These components enable deriving from the value of the control current signal the value of the flow rate. The derived value of the flow rate is represented visually by the display means.

Having explained the construction of the flow meter of the invention the functioning thereof will now be described.

In the initiation mode when the flow of fluid not passes yet through the conduit the voltage supplied from source 9 energizes the coils of the differential transformer. Since the float member resides not in the neutral position but is displaced therefrom towards one of the coils, the differential transformer means outputs a response signal, which is processed by the signal processing means and is supplied to the solenoid as a current, inducing magnetic field in the conduit. This magnetic field attracts the float member to the neutral position.

Once the fluid passes through the conduit it imposes a drag force on the float member, which displaces it away from the neutral position. The differential transformer outputs a response signal, which is proportional to the displacement. This signal is subtracted by the subtracting block 11, amplified by the first amplifier 12, rectified by the rectifier 13 and then upon conforming with the RC circuit 14 and amplifying by the second amplifier 15 is converted into control current signal by the inverter means 16. This control current signal is supplied to the solenoid and controls the magnetic field produced thereby so as to impose on the float member a magnetic force, which is sufficient to resist the drag of the flow and retain the float member in the neutral position.

It has been revealed that when the fluid consists of one phase (e.g. liquid or gas) or more, than one phase (e.g. liquid with bubbles of gas) there exists a relationship between the mass or volume flow rate and the control current supplied to the solenoid.

For one phase fluids this relationship is described by the equation $KI_s = \rho Q$, where K is coefficient of proportionality, $I_s$ is the control current supplied to the solenoid, Q is volume flow rate in $m^3/sec$ and $\rho$ is density of the fluid in $kg/m^3$.

For two-phase fluids this relationship is described by the equation $KI_s = ma$, where m is mass of the fluid in kg, a is acceleration in $m/sec^2$.

In the initial mode the flow meter a calibration curve is established with the aim of the above relationships. The curve is established by inputting the known value of flow rate or density of a fluid to be measured into relevant equation and calculating corresponding values of the control current signal. The source of reference voltage 17 is used to calibrate the flow meter to show zero signal.

In the measurement mode the calculation block derives the value of flow rate by inputting the measured value of the control current signal into established calibration curve. The calculated value of the flow rate is displayed on display 19.

The flow meter of the invention has very simple construction and it is very cheap. The flow meter was successfully used for measurement of flow rate of water or mixture of water with air. Weighing verified the accuracy of measurement.

For measuring of water the inside diameter of the conduit varied from 6 mm up to 20 mm and the range of measured mass flow rate was 0.005–30 kg/min, the accuracy of measurement was ±0.15% of rate±zero stability.

For measurement of water-air mixture the inside diameter of the conduit was 20 mm and the range of measured mass flow rate was 0.5–10 kg/min, the accuracy of measurement was ±0.25% of rate±zero stability.

Thus the flow meter of the invention is capable to measure wide range of flow rate with accuracy, which is not worse, than the accuracy of know in the art flow meters, while its cost is less.

It should be appreciated that the present invention is not limited by the above-described embodiments and that one ordinarily skilled in the art can make changes and modifications without deviation from the scope of the invention as will be defined below in the appended claims.

It should also be appreciated that features disclosed in the foregoing description, and/or in the following claims, and/or examples, both separately and in any combination thereof, be material for realizing the present invention in diverse forms thereof.

What is claimed is:

1. A flow meter for measuring the flow rate of a fluid comprising:

a tubular conduit for passing the fluid therethrough, a float member, disposed within the conduit capable of displacement from a neutral position by a drag imposed thereon by the fluid, at least a portion of said float member is made of magnetically responsive material, a differential transformer surrounding the conduit comprising two separate coils connected to a variable resistor, said differential transformer providing a responsive electrical signal upon displacement of the float member from the neutral position, a magnetic means operatively associated with the conduit for exerting on the float member a magnetic force sufficient to retain the float member in the neutral position, a source of alternating voltage connected to said differential transformer, a signal processing means connected to the differential transformer for processing the responsive signal produced by the differential transformer and for controlling the magnetic means, by outputting a control current signal to said magnetic means, a source of reference voltage, said source of reference voltage connected to a calculating means for deriving the flow rate from the control current signal, the input of the calculating means is connected to the output of the signal processing means and to the output of the source of reference voltage, a display means connected to the output of the calculating means for visual representation of the derived flow rate value, wherein said magnetic means is configured as a solenoid, which closely surrounds the conduit, the inwardly facing surface of the solenoid matches the outwardly facing surface of the conduit, said solenoid resides between the coils of the differential transformer means and is connected to the output of the signal processing means and wherein said signal processing means includes a subtracting means, a first amplifier, a rectifier, an RC circuit, a second amplifier and an inverter means, connected in series for outputting the control current signal to the magnetic means and calculating means.

2. The flow meter as defined in claim 1, in which the coils of the differential transformer are separated from the solenoid by insulating inserts.

3. The flow meter as defined in claim 2, in which the conduit is configured as a cylinder, made of non-ferromagnetic material and within the conduit are provided two opposite stoppers capable to limit the displacement of the float member from magnetic field, produced by the magnetic means.

4. The flow meter as defined in claim 3, in which the float member is configured as an elongated, substantially tubular body and on the outwardly facing thereof are made protrusions capable to center the float member within the conduit substantially concentrically with the longitudinal axis of the conduit.

5. The flow meter as defined in claim 4, in which within the float member is removably deployed a disc-like insert, said insert including a calibrated orifice.

6. The flow meter as defined in claim 1, wherein the fluid comprises a single phase.

7. The flow meter as defined in claim 1, wherein the fluid comprises two phases.

8. The flow meter as defined in claim 1, wherein the fluid comprises a water-air mixture.

9. The flow meter as defined in claim 5, wherein the fluid comprises a water-air mixture.

* * * * *